(No Model.)
E. WESTON.
DIAL THERMOMETER.
No. 511,006. Patented Dec. 19, 1893.
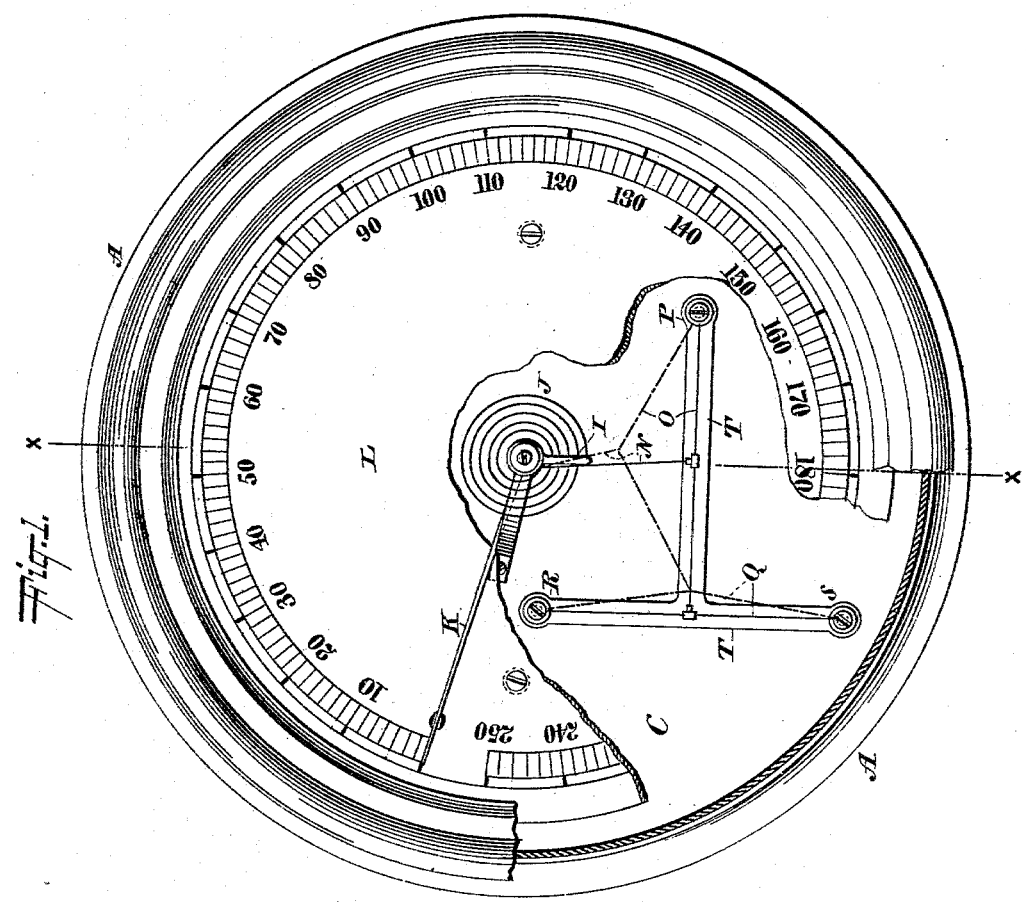
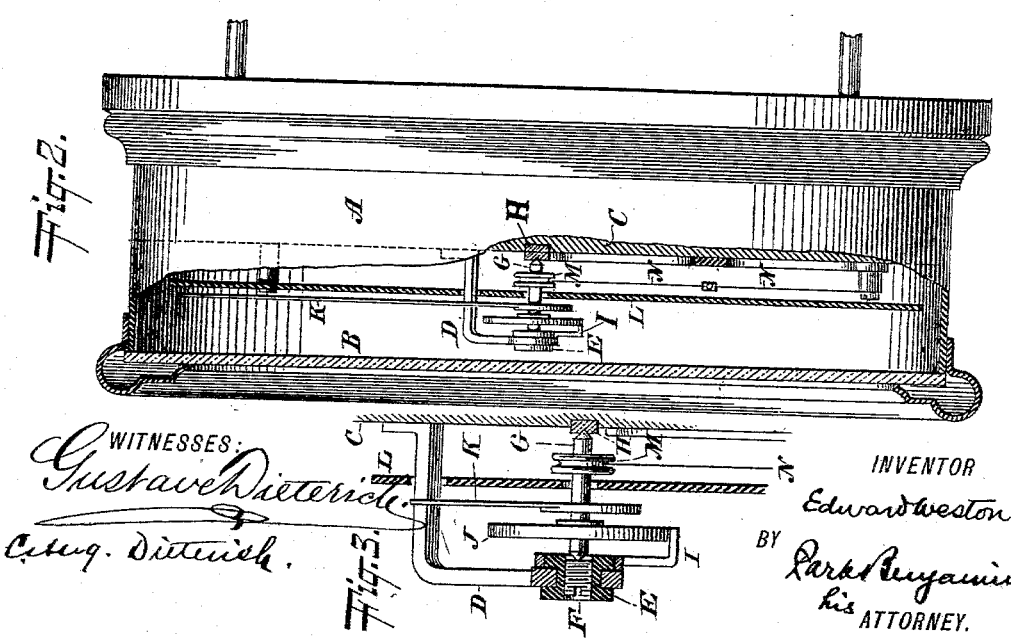
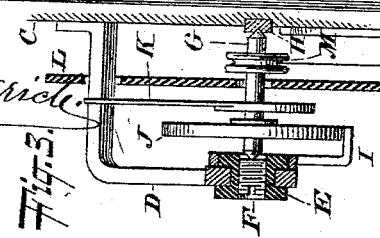
WITNESSES:
Gustave Dieterich
C. Ing. Dieterich.
INVENTOR
Edward Weston
BY Park Benjamin
his ATTORNEY.

UNITED STATES PATENT OFFICE.

EDWARD WESTON, OF NEWARK, NEW JERSEY.

DIAL-THERMOMETER.

SPECIFICATION forming part of Letters Patent No. 511,006, dated December 19, 1893.

Application filed January 8, 1892. Serial No. 417,414. (No model.)

*To all whom it may concern:*

Be it known that I, EDWARD WESTON, of Newark, Essex county, New Jersey, have invented a new and useful Improvement in Thermometers, of which the following is a specification.

The principle of my invention may be defined broadly as follows:—first, to cause in a body extended between two points and subjected to strain applied at an angle to the longitudinal direction of said body, an elongation or expansion whereby said strain is enabled to cause a point on said body to move to a new position the longitudinal extent of which movement is greater than the elongation or expansion of said body; and second, to connect a second flexible body to said point on said first body and to an abutment, and to subject said second body to a strain angularly applied, whereby, when said point of attachment of movable abutment is moved toward the fixed abutment, the point of application of said strain to said second body shall traverse a distance greater in extent than that traversed by said movable abutment.

My present invention is an apparatus for carrying said principle into practical effect in the construction of a thermometer, in which the elongation or expansion of the bodies above-named is produced by variations in adjacent temperature of said bodies; the said variations being due to changes of temperature in the medium in which the instrument may be placed.

It is, of course, to be understood that the instrument is operated by contractions of the sensitive bodies contained in it, as well as by elongations or expansions; but equally, for the sake of clearness of explanation, I have assumed the normal condition of the instrument to be such that its initial operation will be by an expansion of the sensitive body in it.

In the accompanying drawings, Figure 1 is a plan view with the scale plate of the instrument broken away to show the internal construction. Fig. 2 is a side view and section on the line X X of Fig. 1. Fig 3 shows the mechanism for actuating the index or pointer in detail.

Similar letters of reference indicate like parts.

The box or case A of the instrument is here shown as cylindrical in form and made of metal or any other suitable material. It is provided with a glass cover B, and with a back or base plate C. Plate C carries a bracket D, which is bent over and which receives a sleeve E. Within the sleeve E is an adjustable support F for one end of the arbor G. The other end of the arbor rests against a step H in the base plate C. The arbor is thus pivoted between the parts F and H. On the sleeve E is a bent arm I, the end of which is connected to an extremity of a coiled spring J. The other end of the coiled spring J is fastened to the arbor G. By turning the sleeve E, the tendency of the spring J to rotate the shaft or arbor G is increased. On the arbor G is an index needle K, which moves over a scale plate L; said scale plate being marked in the usual manner in degrees, according to any known thermometric scale. Also on the shaft G is a disk M, to the periphery of which is secured one end of a fine wire N, which communicates with a wire O; the said wire O being made of metal or any other material which has a high coefficient of expansion for increased temperature. The wire O extends from a fixed pin P, to which it is connected to about the middle of a similar wire Q, to which the other end is fastened. The wire Q extends between two pins or posts R, S. The posts R, S and P may, for convenience, be secured to the three ends of a T-shaped plate, T. This plate is to be made of some material different from that of which the wires O and Q are made, and preferably of a substance which has a very low coefficient of expansion; the intention being that the plate T shall not act in anywise to compensate for elongation of the wire. I call particular attention to this feature because, in other applications of my present principle, namely, to electrical measuring instruments, I use plates similar to T made of metal which does compensate for variations in the length of the wires due to changes in atmospheric temperature. Of course, in a thermometer, any such compensation would not only be useless, but positively detrimental.

It will be seen from the arrangement of the wires O and Q that the wire Q is extended between two fixed abutments R and S, and that the wire O is extended between a fixed abutment P and the wire Q. It will also be observed that the wire O stands at right angles to the wire Q, and that the wire N is very nearly at right angles to the wire O. When the wire Q is caused to expand by augmented temperature, it will no longer extend in practically a straight line between the abutments R and S, but by the strain transmitted from the arbor G, which the spring J tends to rotate through the wire N and the wire O, it will be drawn out of a straight line and into such a position as is indicated by the dotted line in Fig. 1. Now, as may be trigonometrically demonstrated, the extent of movement of the point on the wire Q, to which the strain of the wire O is applied, will be very much greater than the extent of longitudinal expansion of the wire Q due to its increased temperature. Furthermore, when the wire Q has taken the position shown by dotted lines, clearly one abutment of the wire O has been moved toward the other or fixed abutment. This at once allows the wire O to be drawn out of a straight line by the pulling action of the wire N; and not only this, but the wire O will be elongated by the same temperature change which affects the wire Q. Consequently, the total extent of motion of the point on the wire O to which the wire N is attached will be very much greater than that of the point on the wire Q, to which the wire O is attached. It follows from this, that for a slight change in the length of the wire Q, we obtain a very large angular displacement of a point on the wire O. Now, as the wire N is fastened to the wire O, it follows that the arbor G will be allowed to rotate by the action of the spring J just to the extent that the wire O slackens; so that the needle or pointer on the arbor G will be carried by it over the scale. The movement of the pointer over the scale will, of course, be proportional to the first cause of its movement; namely, the effect of the temperature upon the wires; and hence, as may be readily perceived, if the scale be suitably graduated, the position of the pointer on the scale will indicate that temperature.

The great advantage of this instrument is the fact that I can obtain by it very large deflections of the index for very small changes in temperature; and in this way, I obtain an instrument of great sensitiveness and capable of showing, with the utmost clearness, the slightest temperature modification. I also produce an instrument which is exceedingly cheap in point of manufacture, and easily constructed. While I have here shown two wires, Q and Q, it will be obvious that I may, if desired, omit the wire O and connect the wire N directly to the wire Q; in which case, the extent of needle deflection for each increment of temperature change would be reduced and the sensitiveness of the instrument measurably lessened. So also, on the other hand, I may add other wires similar to O and Q, each wire in turn being connected at an angle to the preceding wire, and at its other end to a fixed abutment, except in the case of the final wire of the series, which, of course, would be the wire N.

I claim—

1. A flexible, heat expanding body extending between fixed abutments, means of applying strain at an angle to a point thereon between said abutments, and an indicating device controlled by the displacement of said point due to said strain when said body expands or elongates under the influence of change in temperature.

2. A flexible, heat expanding body extending between fixed abutments, a means of applying strain at an angle to a point thereon between abutments, and an index or pointer and scale; the said index being controlled by the displacement of said point due to said strain when said body expands or elongates under the influence of change in temperature.

3. A flexible, expansible body extending between abutments, a second flexible body maintained in a state of tension connected to a point on said first body and extending at an angle thereto, and an index controlled by said second flexible body when said first body varies in length under the influence of changes in temperature.

4. A flexible, expansible body extending between abutments, a second flexible and expansible body maintained in a state of tension connected to a point on said first body and extending at an angle thereto, and an index actuated by both of said bodies when they vary in length under the influence of changes in temperature.

5. A flexible, expansible body extending between abutments, a means of applying strain at an angle to said body to a point thereon between said abutments, a means actuated or controlled by temperature changes for moving one of said abutments, and an indicating device showing the displacement of said point due to said strain when the distance between said abutments is varied.

6. A flexible, expansible body extending between abutments, a rotary shaft, a cord or wire extending from a point on said body in an angular direction thereto and connected to said shaft, a means of rotating said shaft and so subjecting said cord or wire to tension, and an indicating device actuated by the permitted rotation of said shaft when said first-named body is elongated or expanded by heat.

7. A flexible, expansible body extending between abutments, a rotary shaft, a cord or wire extending to a point on said body in an angular direction thereto and connected to said shaft, a spring secured at one extremity to said shaft and at the other extremity to an abutment and operating to rotate said shaft and thus to subject said cord or wire to tension, a scale and an index or pointer moving over said scale and actuated by the rotation of said shaft by said spring when said first-named body is elongated or expanded by heat.

8. The combination in a thermometer of a wire or filament Q expansible by heat and extending between abutments, a shaft G, a spring J connected at one end to said shaft and at the other end to an abutment, a flexible wire or cord extending between said shaft and a point on said wire Q between said abutments, a thermometer scale and an index or pointer on said shaft G moving over said scale.

9. The combination in a thermometer of a wire or filament Q expansible by heat and extending between abutments, a shaft G, a spring J connected at one end of said shaft, an abutment I adjustable to vary the torque of said spring, and to which the other end of said spring is fastened, a flexible wire or cord extending between said shaft and a point on said wire Q between said abutments, a thermometric scale, and an index or pointer on said shaft G moving over said scale.

EDWARD WESTON.

Witnesses:
R. C. FESSENDEN,
H. R. MOLLER.